United States Patent [19]

Dennis

[11] Patent Number: 5,587,103
[45] Date of Patent: Dec. 24, 1996

[54] COMPOSITION, AND METHOD FOR USING SAME, FOR ETCHING METALLIC ALLOYS FROM A SUBSTRATE

[75] Inventor: Timothy A. Dennis, Bloomdale, Ohio

[73] Assignee: Harris Corporation, Melbourne, Fla.

[21] Appl. No.: 587,692

[22] Filed: Jan. 17, 1996

[51] Int. Cl.⁶ ............................................. C09K 13/08
[52] U.S. Cl. ...................... 252/79.3; 216/102; 216/103; 216/104; 134/3; 156/656.1
[58] Field of Search .................... 216/103, 104; 134/3, 41; 252/79.1, 79.3

[56] References Cited

U.S. PATENT DOCUMENTS

| | | | |
|---|---|---|---|
| 2,729,551 | 1/1956 | Cohn | 216/103 |
| 5,104,820 | 4/1992 | Go et al. | 437/51 |
| 5,256,247 | 10/1993 | Watanabe et al. | 156/653 |

OTHER PUBLICATIONS

"Sputtering Targets and Evaporation Sources", Materials Research Corporation; Orangeburg, New York; Chapter 7 (reference data); Reprinting based on 1978 Publ.

*Primary Examiner*—R. Bruce Breneman
*Assistant Examiner*—Michael E. Adjodha
*Attorney, Agent, or Firm*—Harry L. Deffebach, III; Charles C. Krawlzyk; William A. Troner

[57] ABSTRACT

A composition for optimally removing or etching metallic alloys from chemically compatible substrates with minimal damage to the substrate. The preferred composition is Ammonium Fluoride, Hydrofluoric Acid, Nitric Acid, Phosphoric Acid and Water in a specified range of quantities used to selectively remove an Aluminum and Silicon Alloy and Titanium film from a chemically compatible substrate. The composition is placed in contact with Stainless Steel, Silicon, or other organic or metallic substrates to remove, etch, or pattern homogenous or layered Aluminum, Silicon, Titanium and Copper Alloys from the substrate with minimal etching to the underlying substrate.

12 Claims, 4 Drawing Sheets

5,587,103

COMPOSITION, AND METHOD FOR USING SAME, FOR ETCHING METALLIC ALLOYS FROM A SUBSTRATE

FIELD OF THE INVENTION

The present invention relates to a composition, and method for use thereof, for removing a first metallic substance from a second chemically compatible substance, and more specifically, to removing metallic alloys such as an Aluminum, Silicon, Copper or Titanium film or Alloy from a substrate such as Stainless Steel while minimizing etching of the substrate.

BACKGROUND OF THE INVENTION

The present invention involves chemical optimization to remove metallic alloys or films from a chemically compatible substrate. The use of metal alloys and substrates in the making of mechanical and electrical systems has become commonplace in many factories. While the use of and combination of metal alloys and metals in various processes is frequently desirable, it is also frequently necessary to remove or separate one metal from the other.

For example, as is known to those skilled in the art of manufacturing semiconductors, Aluminum Alloys and Titanium films are sputtered onto a semiconductor substrate. The Aluminum Alloy is used to form electrical connections on the surface of the substrate. As is known to those skilled in the art, the machines commonly used to apply such Aluminum Alloys to the substrate are called sputterors or evaporator systems and fall under the label of physical vapor deposition devices. Such evaporator systems deposit patterned Aluminum Alloy wiring on the substrate, as is known to those skilled in the art. The Aluminum Alloy is commonly composed of Aluminum and Silicon, but can also include Aluminum and Titanium, or Aluminum alloyed with other materials. The substrate is commonly Silicon, but can be Gallium Arsenide or other semiconductor material.

Generally described, the evaporator system is utilized to deposit the Aluminum Alloy film on the surface of semiconductor wafers to form wire connections. Although it is not necessary to understanding the present invention, a brief summary of the operation of the evaporator is supplied as background. Evaporation or sputtering is accomplished using a liquefied metallic material (commonly an Aluminum Alloy). A target surface is bombarded with energetic ions that dislodge target atoms from the target surface. Under proper conditions the "sputtered" atoms are transported to the surface of semiconductor wafers where they deposit to form a thin film. It is during this operation that the Aluminum Alloy is also deposited on the Stainless Steel substrate of the evaporator system.

During patterning the Aluminum Alloy thus adheres to the Stainless Steel parts of the evaporator system. In other words, an unwanted layer or build-up of the Aluminum Alloy will be deposited on the Stainless Steel evaporator as a by-product of using the evaporator system to deposit wiring on the semiconductor substrate. To ensure continued usability of the evaporator system, the Aluminum Alloy film must be removed from the evaporator system.

The common manner in the industry for removing the Aluminum Alloy involves the use of acid baths to clean the Aluminum Alloys from the Stainless Steel. Commonly used solutions include a mixture of Hydrogen Peroxide and Phosphoric Acid. However, such a mixture applied to the Aluminum Alloy deposit produces a brown Silicon residue that remains on the evaporator system. The Silicon residue will not be removed by the Hydrogen Peroxide and Phosphoric Acid bath. This residue adheres to the evaporator system and contaminates future operation of the evaporator. Further, the acids often etches the Stainless Steel as well as the Aluminum Alloy, thereby permanently damaging the evaporator system to inhibit or preclude further use of the system.

There are many other examples of removing alloy films from a chemically compatible substrate. Such a film might be a copper alloy that is deposited on a glass surface. Removing or patterning the alloy without damaging the substrate is difficult, but necessary in industrial applications.

Processes known to those skilled in the art for patterning or removing alloys from chemically compatible substrates typically entail multiple step exposures to a variety of acid baths, washes and other solutions to clean specific metals. For example, in the semiconductor industry it is known to those skilled in the art that Buffered Oxide Etch is a solution that etches Titanium, whereas Nitric acid does not etch Titanium. As is known to those skilled in the art, Buffered Oxide Etch is a mixture of Ammonium Fluoride and Hydrofluoric Acid. Thus, to etch or strip an Aluminum-Titanium Alloy, Buffered Oxide Etch and another solution must be used to strip both materials. Further chemical and :mechanical steps are generally required to remove the alloy from the substrate.

However, the proper composition or mixture to etch various Aluminum Alloys and Titanium films from substrates without damaging the underlying substrate was not known. Further, the user does not know what is the proper solution to most quickly remove the alloy from the substrate.

Thus, it would be desirable to have an etching or stripping solution that optimally removes various Aluminum and Copper Alloys from chemically compatible substrates with limited etching of the substrate.

SUMMARY OF THE INVENTION

The present invention addresses the above described need in the art by providing a composition, and method for use thereof, for optimally removing alloys from chemically compatible substrates with minimal damage to the substrate. The preferred composition is Ammonium Fluoride, Hydrofluoric Acid, Nitric Acid, Phosphoric Acid and Water in quantities described below used to selectively remove an Aluminum Alloy and Titanium film from a chemically compatible substrate. More specifically, the present invention utilizes the composition set forth above to etch Aluminum or Copper Alloys from chemically compatible substrates such as Stainless Steel, Silicon, or other organic or metallic substrate. It is important that the substrate and deposited material to be etched (i.e., Aluminum Alloy) be chemically compatible, meaning that the deposit can be removed without significantly eroding the underlying substrate.

The preferred composition for removing Aluminum and Silicon Alloy combined with Titanium films from a chemically compatible substrate is five to ten parts by volume Nitric Acid, four to ten parts by volume Buffered Oxide Etch, thirty to sixty-five parts by volume Phosphoric acid and twenty-one to thirty parts by volume Water. This composition is optimized to produce a high rate of removing the Aluminum Alloy and Titanium film while minimally etching the substrate.

The preferred method for removing the Aluminum and Silicon Alloy from a chemically compatible substrate is applying the above-defined composition to the Aluminum Alloy at ambient temperature in a tank to remove the Aluminum Alloy from the substrate. For example, the composition can be applied to the Stainless Steel surface of the evaporator system that has an Aluminum and Silicon alloy deposited thereon, then the Stainless Steel surface can be water rinsed and dried. Such application will result in removal of the Aluminum and Silicon in a single chemical strip step. The application is optimized to reduce etching or erosion of the Stainless Steel. Further chemical or mechanical cleaning steps are not necessary in the present invention.

It is an object of the present invention to provide an improved etching and stripping composition for optimally removing metallic alloys from chemically compatible substrates while minimizing etching of the substrate.

It is a further object of the prevent invention to provide an improved composition for etching and removing Aluminum Alloys from a chemically compatible substrate in a single step.

It is a further object of the present invention to provide an improved composition that can be used to etch Aluminum Alloys from a Stainless Steel substrate.

Other objects, advantages, and features of the present invention will become apparent from the following detailed description of the invention when considered in conjunction with the accompanying drawings.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
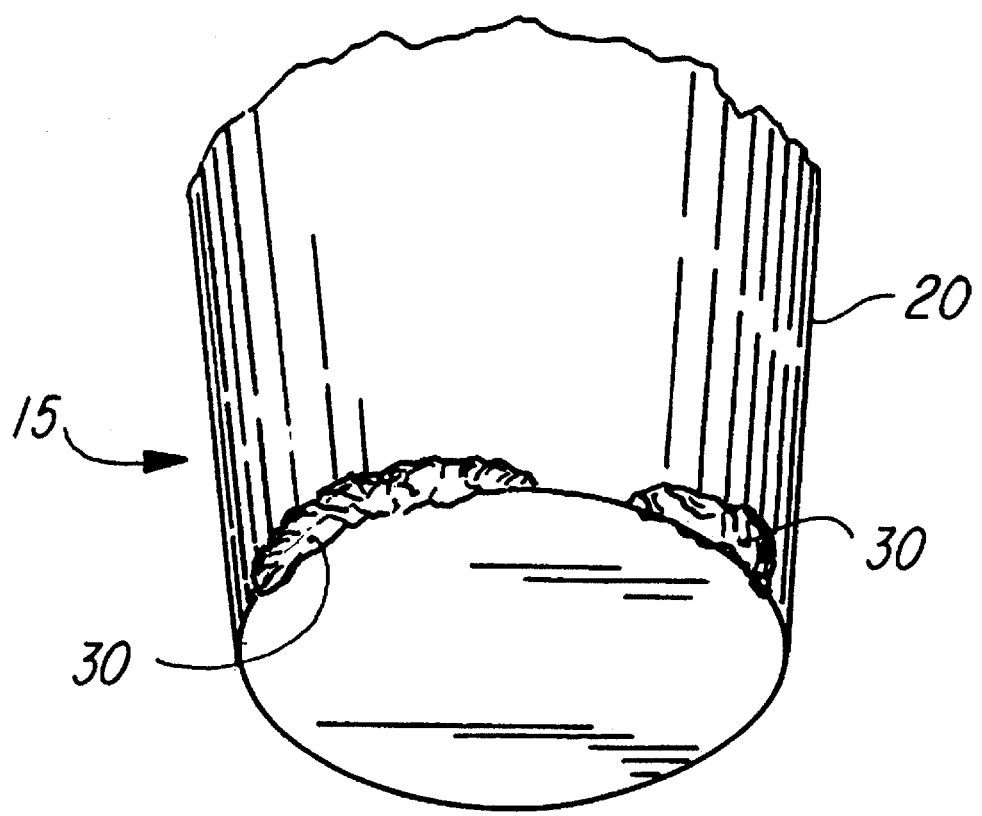
FIG. 1 is a perspective view of an Aluminum Alloy deposited on a Stainless Steel substrate.

Referring now to FIG. 1, there is shown the tip 15 of an evaporator system that forms a stainless steel substrate 20 for Aluminum Alloy deposits 30 thereon. The Aluminum Alloy deposits 30 are an Aluminum and Silicon alloy formed of approximately ninety-nine percent (99%) Aluminum and one-percent (1%) Silicon, although the Aluminum to Silicon ratio in the Alloy can vary substantially. The Aluminum Alloy 30 is shown in discreet deposits, but may be a uniform film. The stainless steel substrate 20 shown is tubular, but may take any shape.

As described above in the Summary of the Invention, the evaporator system is utilized to deposit an Aluminum Alloy film on the surface of semiconductor wafers (not shown). The thin film of Aluminum Alloy is patterned to form electrical connections. It is during deposition of the Aluminum Alloy on the semiconductor surface that the Aluminum Alloy deposits 30 are formed on the Stainless Steel substrate 20 of the evaporator system.

The preferred embodiment of the present invention is a composition that provides optimal etching or removal of the Aluminum Alloy 30 with minimal stripping of the stainless steel substrate 20. The preferred composition of the present invention is five to ten parts by volume of Nitric Acid, four to ten parts by volume Buffered Oxide Etch, thirty to sixty-five parts by volume Phosphoric Acid, and twenty-one to thirty parts by volume Water. Within the preferred range of the composition of the present invention, one exact preferred composition for etching an Aluminum and Silicon Alloy and Titanium film from a Stainless Steel substrate is seven point two (7.2) parts by volume Nitric Acid, five point eight (5.8) parts by volume Buffered Oxide Etch, sixty (60) parts by volume Phosphoric Acid, and twenty-nine (29) parts by volume Water.

As is known to those skilled in the art, the above referenced solutions have chemical equations of: Nitric Acid—$HNO_3$; Buffered Oxide Etch is a twenty-five (25)-to-four (4) mixture of Ammonium Fluoride $NH_3F$ and Hydrofluoric Acid—$HF$; Phosphoric Acid—$H_3PO_4$; and Water—$H_2O$. Throughout this description, the term composition is utilized to describe the preferred embodiment of the present invention. The term solution is used to describe the component chemicals that are combined to form the composition.

In the preferred embodiment, standard chemical concentrations for each of the above solutions are: seventy percent (70%) by weight Nitric Acid, eighty-five percent (85%) by weight Phosphoric Acid, forty-nine percent (49%) by weight Hydrofluoric Acid and forty percent (40%) by weight Ammonium Fluoride in the Buffered Oxide Etch, and one-hundred percent (100%) by weight Water, wherein Water is the remainder of each solution not attributed to the identified chemical solution. Although the above standard chemical concentrations are used in the preferred embodiment of the present invention, those skilled in the art will recognize that other stronger or weaker concentrations can be utilized within the scope of the present invention. For example, solutions with higher per weight concentrations of BOE, Phosphoric Acid and Nitric Acid could be utilized and combined in the preferred composition of the present invention with more Water.

Figure 2:
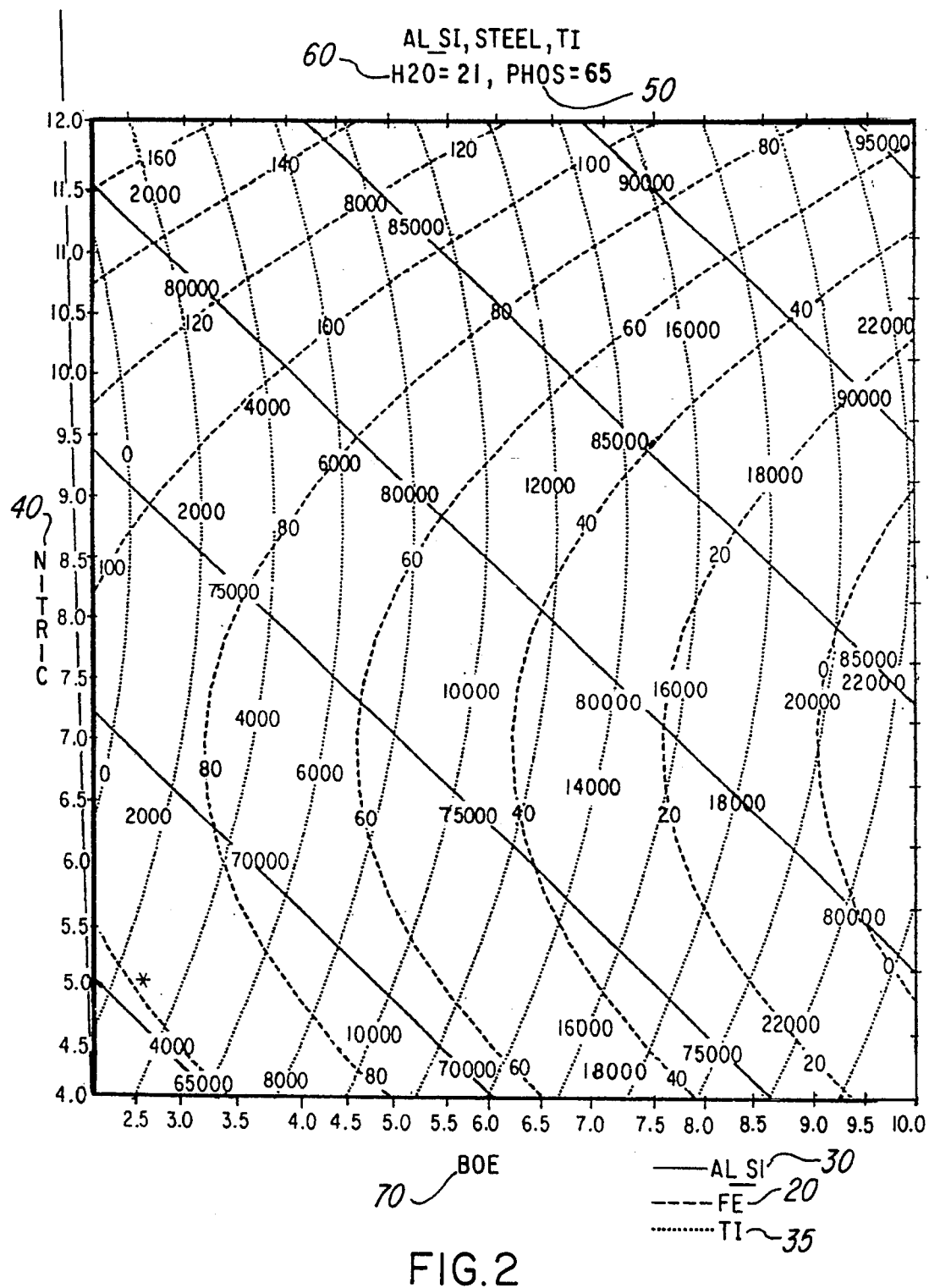
FIG. 2 is a portion of an etch rate contour map for Stainless Steel, Titanium and an Aluminum and Silicon Alloy exposed to varying compositions of chemicals which is illustrative of some of the salient features of the present invention.

Referring now to FIG. 2, shown is a contour map of etch rates of the Aluminum Alloy 30 and Stainless Steel substrate 20 of FIG. 1, along with Titanium 35, when exposed to varying chemical compositions. The Aluminum and Silicon Alloy is ninety-nine percent (99%) Aluminum and one percent (1%) Silicon. These etch rates are calculated based on exposure to the chemicals that together are the preferred composition of the present invention. The Nitric Acid 40 is shown on the y-axis ranging from four to twelve parts by volume. The Buffered Oxide Etch 70 is shown on the x-axis ranging from two to ten parts by volume. The Water 60 is at twenty-one (21) parts by volume. The Phosphoric Acid 50 is at sixty-five (65) parts by volume.

Referring to the legend at the bottom of FIG. 2, the etch rates for the three materials are marked: for the Aluminum and Silicon Alloy 30 with a solid line; for the Stainless Steel (Fe) 20 with a heavy dashed line; and for Titanium (Ti) 35 with a light dotted line. This contour plot shows the effect on etch rate of the three materials using varying levels of Nitric Acid 40 and Buffered Oxide Etch 70 and constant volumes of Water 60 and Nitric Acid 40.

Referring now to the point on the contour plot at five point five (5.5) parts per volume Buffered Oxide Etch 70 and eleven (11) parts per volume Nitric Acid 40, the three plotted elements have the following values: Aluminum and Silicon Alloy 30 is etched at eighty-five thousand (85,000) Angstroms/hour (A/hr) the Stainless Steel 20 is etched at one-hundred (100) A/hr, and the Titanium 35 is etched at ten-thousand (10,000) A/hr. Thus, the Aluminum and Silicon Alloy 30 is etched very quickly, the Titanium 35 more slowly and the Stainless Steel 20 is etched very slowly.

As can be seen on the contour plot in FIG. 2, the Titanium 35 is etched at between four to six thousand (4,000–6,000) A/hr between two point five (2.5) and three (3) parts per volume Buffered Oxide Etch 70. As Buffered Oxide Etch 70 increases by volume across the x-axis, the Titanium 35 etches more quickly, including at a rate of above twenty thousand (20,000) A/hr at nine (9.0) parts per volume Buffered Oxide Etch 70.

Likewise, the etch rate of the Aluminum and Silicon Alloy 30 increases as the parts per volume of Buffered Oxide Etch 70 increases. Note, however, that increasing content of Nitric Acid 40 also increases the etch rate of the Aluminum and Silicon Alloy 30. This is illustrated by the less vertical solid line representing the etch rate of the Aluminum and Silicon Alloy 30, indicating that as the content of Nitric Acid 40 increases the etch rate of the Aluminum and Silicon Alloy 30 increases. Looking at the dark dotted line representing the etch rate of Stainless Steel 20, regardless of the Nitric Acid 40 or Buffered Oxide Etch 70 content of the composition, the etch rate only varies from zero (0) to one hundred and sixty (160) A/hr. Thus, the etch rate of Stainless Steel 20 remains low regardless of the Nitric Acid 40 and Buffered Oxide Etch 70 content.

Figure 3:
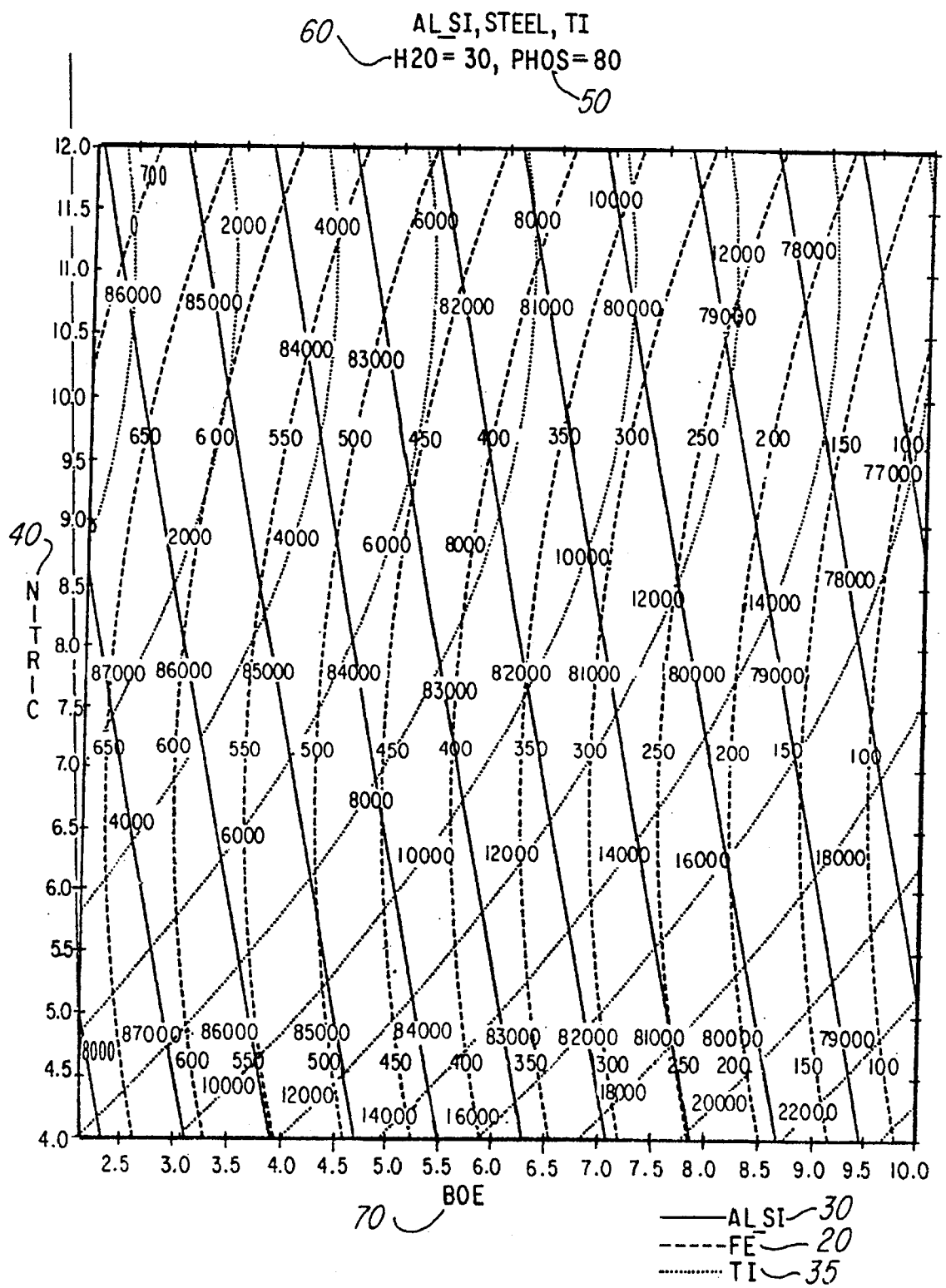
FIG. 3 is a portion of an etch rate contour map for stainless steel and an Aluminum Alloy exposed to varying compositions of Buffered Oxide Etch and Nitric Acid with content of Water and Phosphoric Acid different from that shown in FIG. 2.

Referring now to FIG. 3, a contour map having volumes of Water 60 and Phosphoric Acid 50 different from that in FIG. 2 is shown. Specifically, the volume of Water 60 and Phosphoric Acid 50 are increased to thirty (30) and eighty (80) parts per volume, respectively. As a result of the changed content of Water 60 and Phosphoric Acid 50, the etch rate of the Aluminum and Silicon Alloy 30 ranges from only seventy-seven thousand (77,000) to eighty-seven thousand (87,000) A/hr. The etch rate of Titanium 35 is again highly dependent on the volume of Buffered Oxide Etch 70.

The etch rate for the Stainless Steel 20 decreases with increased content of Buffered Oxide Etch 70. Significantly, however, the maximum etch rate of one-hundred and sixty (160) A/hr for Stainless Steel 20 ranges from one hundred (100) to six hundred and fifty (650) A/hr, much higher than the etch rate for Stainless Steel 20 shown in the contour plot in FIG. 2. The compositions shown in FIG. 2 thus etch the Stainless Steel 20 at a lesser rate than the compositions in FIG. 3, and the Aluminum and Silicon Alloy 30 is etched at about the same rate in FIGS. 2 and 3.

Figure 4:
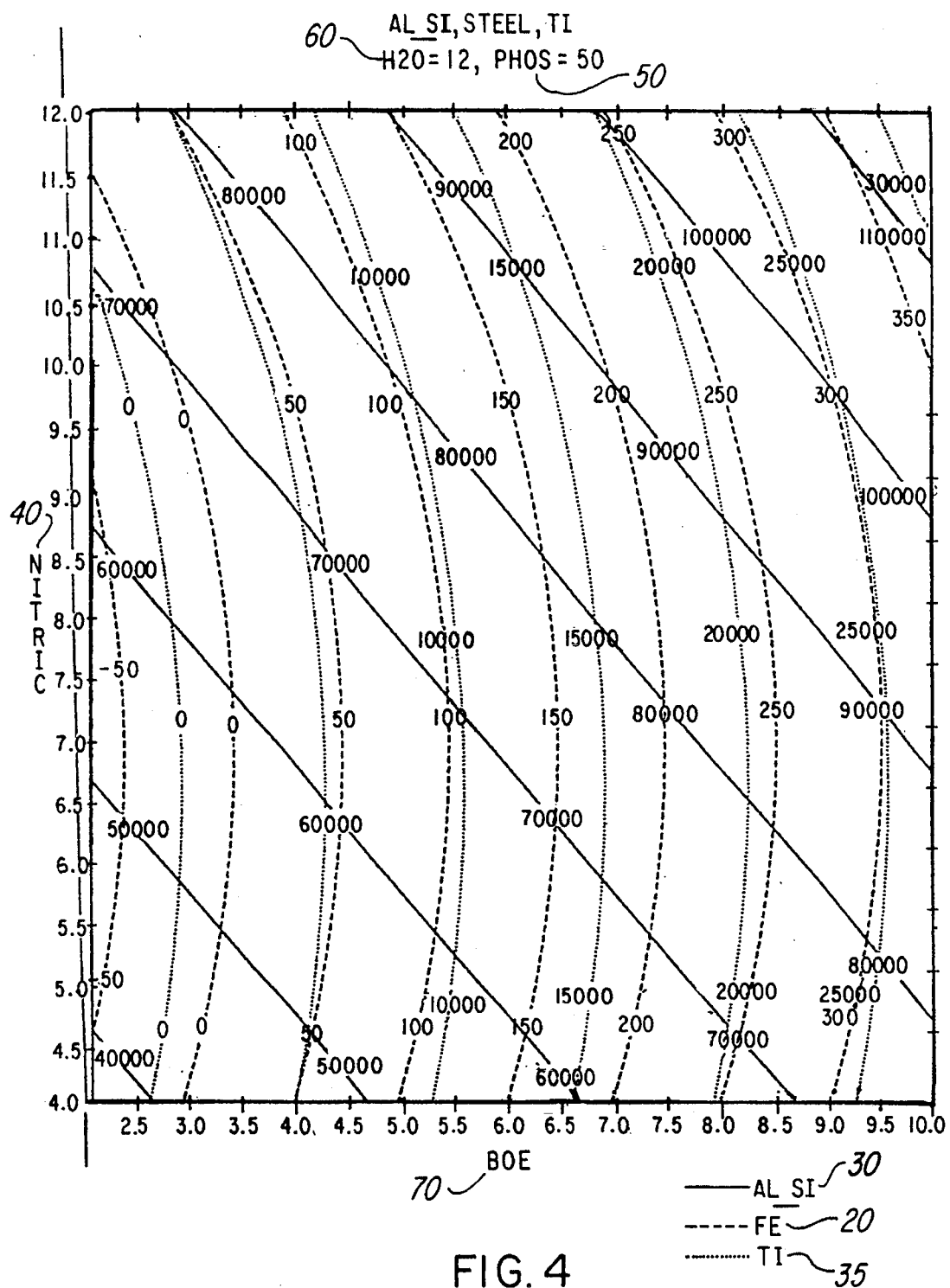
FIG. 4 is a portion of an etch rate contour map for stainless steel and an Aluminum Alloy exposed to varying compositions Buffered Oxide Etch and Nitric Acid with content of Water and Phosphoric Acid different from that shown in FIG. 2.

Referring now to FIG. 4, a contour plot shows the etch rates for Stainless Steel 20, Aluminum and Silicon Alloy 30 and Titanium 35 wherein the Water 60 volume is twelve (12) and the volume of Phosphoric Acid 50 is fifty (50) A/hr. The etch rate for the Aluminum and Silicon Alloy 30 varies from forty thousand (40,000) to one hundred and ten thousand (110,000) A/hr, depending on the volume of Nitric Acid 40 and Buffered Oxide Etch 70. This variation is much greater than the range of the etch rate for the Aluminum and Silicon Alloy 30 shown in FIG. 2. The etch rate for Stainless Steel 20 ranges from zero (0) to three hundred and fifty (350) A/hr, which is higher than the highest etch rate for Stainless Steel 20 shown in FIG. 2. The etch rate for Titanium 35 ranges from zero (0) to thirty thousand (30,000) A/hr.

As can be seen by reviewing the contour plots in FIGS. 2, 3, and 4, the etch rates of materials can be adjusted by controlling the quantities of Water 60, Phosphoric Acid 50, Nitric Acid 40, and Buffered Oxide Etch 70. The preferred composition of the present invention is five to ten parts by volume of Nitric Acid, four to ten parts by volume Buffered Oxide Etch, thirty to sixty-five parts by volume Phosphoric Acid, and twenty-one to thirty parts by volume Water, which composition is best represented by the contour plot in FIG. 2. The contour plots in FIGS. 2–4 illustrate that this composition provides fast etching of the Aluminum and Silicon Alloy 30 and Titanium 35 while limiting etching of the Stainless Steel 20. The range of values for the composition allows for variation to effect etch rates of different materials. For example, the user may select the Buffered Oxide Etch and Nitric Acid to have lower ratios within the desired range whereby additional Buffered Oxide Etch and Nitric Acid can be added during use of said composition to lengthen the active life of the composition as the Buffered Oxide Etch and Nitric Acid are consumed during etching.

While the preferred composition has been disclosed for removing an Aluminum and Silicon deposit from a Stainless Steel substrate, other deposits and substrates can be appropriately treated. For example, a Copper Alloy can be etched or removed from a glass substrate, using the preferred composition. Those skilled in the art will recognize that substrates other than Stainless Steel 20 may be used. The substrate needs to be chemically compatible with the metallic alloy and to be a material that will not etch at a high rate in the presence of Nitric Acid 40, Phosphoric Acid 50 and Buffered Oxide Etch 70. Further, those skilled in the art will also recognize that the composition of the present invention can be used to selectively etch patterns of an alloy into a chemically compatible substrate by controlling application of the composition to the alloy.

In the drawings and specification, there have been disclosed typical preferred embodiments of the invention, and although specific terms are employed, they are used in a generic and descriptive sense only and not for purposes of limitation, the scope of the invention being set forth in the following claims.

That which is claimed:

1. A method for removing Aluminum Alloy from a substrate comprising applying a composition to said Aluminum Alloy, said composition being five (5) to ten (10) parts by volume Nitric Acid, four (4) to ten (10) parts by volume Buffered Oxide Etch, thirty (30) to sixty-five (65) parts by volume Phosphoric Acid, and twenty-one (21) to thirty (30) parts by volume Water.

2. The method of claim 1 wherein said step of applying said composition includes applying said composition to said Aluminum Alloy formed on a Stainless Steel substrate.

3. The method of claim 1 wherein said step of applying said composition includes applying said composition to Aluminum Alloy that is comprised of Aluminum and Silicon.

4. The method of claim 1 wherein said step of applying said composition includes applying said composition to Aluminum Alloy that is comprised of Aluminum, Silicon and Titanium.

5. The method of claim 4 wherein said step of applying said composition includes applying said composition to an Aluminum, Silicon and Titanium Alloy that is homogenous.

6. The method of claim 1 wherein said step of applying said composition includes applying said composition to selectively pattern said Aluminum Alloy.

7. A composition for etching an Alloy from a chemically compatible substrate comprising five (5) to ten (10) parts by volume Nitric Acid, four (4) to ten (10) parts by volume Buffered Oxide Etch, thirty (30) to sixty-five (65) parts by volume Phosphoric Acid, and twenty-one (21) to thirty (30) parts by volume Water.

8. The composition of claim 1 wherein the Alloy is an Aluminum and Silicon Alloy and said composition is seven point two (7.2) parts by volume Nitric Acid, five point eight (5.8) parts by volume Buffered Oxide Etch, sixty (60) parts by volume Phosphoric Acid, and twenty-nine (29) parts by volume Water.

9. The composition of claim 1 wherein the Alloy is a Silicon, Aluminum and Titanium Alloy and said composition is seven point two (7.2) parts by volume Nitric Acid, five point eight (5.8) parts by volume Buffered Oxide Etch, sixty (60) parts by volume Phosphoric Acid, and twenty-nine (29) parts by volume Water.

10. A composition for etching an Aluminum and Silicon Alloy from a Stainless Steel substrate comprising five (5) to ten (10) parts by volume Nitric Acid, four (4) to ten (10) parts by volume Buffered Oxide Etch, thirty (30) to sixty-five (65) parts by volume Phosphoric acid, and twenty-one (21) to thirty (thirty) parts by volume Water.

11. The composition of claim 10 wherein the Buffered Oxide Etch and Nitric Acid have lower parts by volume whereby additional Buffered Oxide Etch and Nitric Acid can be added during use of said composition to lengthen the active life of said composition.

12. The composition of claim 10 wherein said Aluminum Alloy is comprised of ninety-nine (99%) Aluminum and one percent (1%) Silicon.

* * * * *